May 21, 1940.　　　P. CATUCCI　　　2,201,476
FISHING REEL
Filed Jan. 12, 1938　　　2 Sheets-Sheet 1
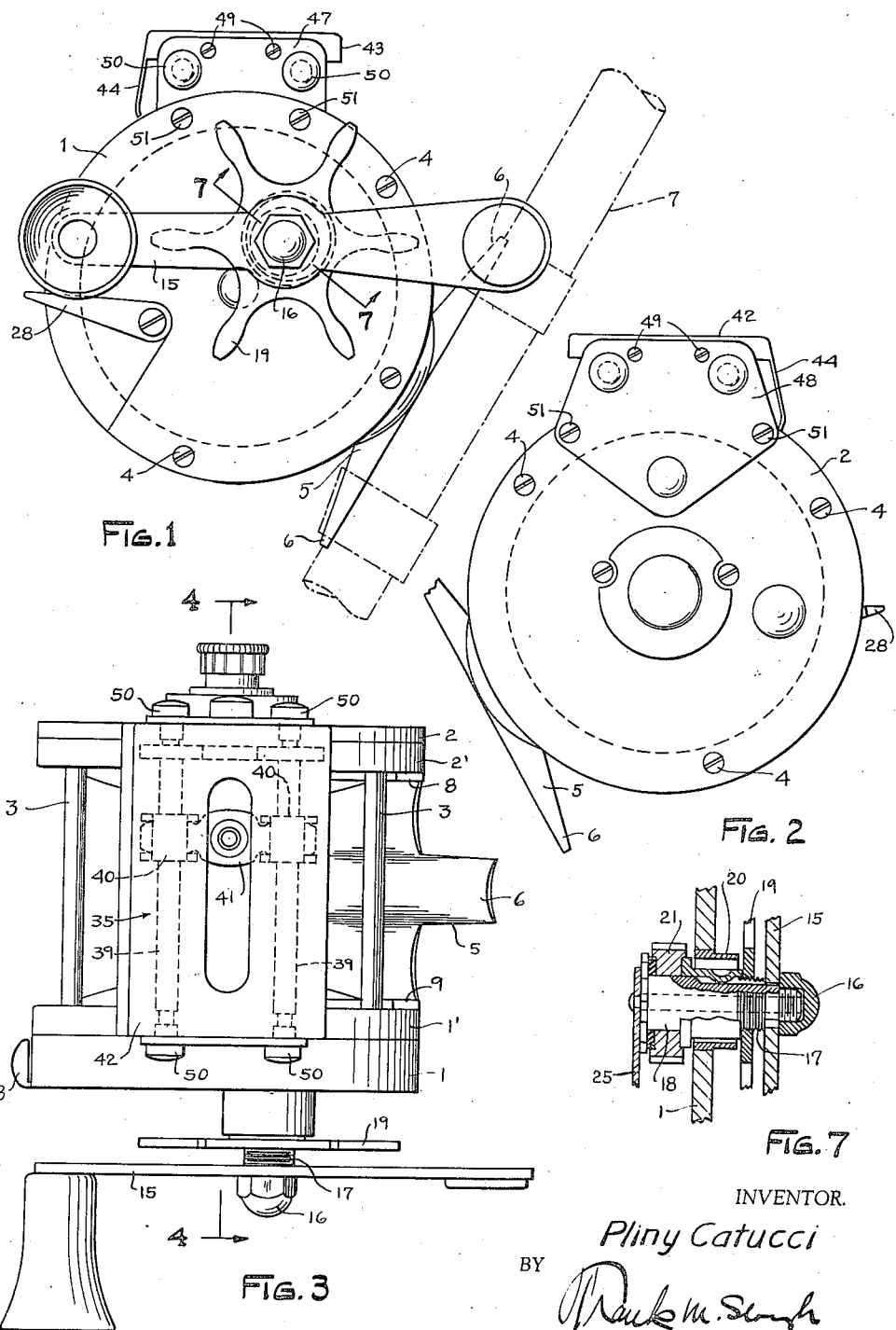
INVENTOR.
*Pliny Catucci*
BY
ATTORNEY.

May 21, 1940.   P. CATUCCI   2,201,476
FISHING REEL
Filed Jan. 12, 1938   2 Sheets-Sheet 2

INVENTOR.
Pliny Catucci
BY
ATTORNEY.

Patented May 21, 1940

2,201,476

UNITED STATES PATENT OFFICE 2,201,476

FISHING REEL

Pliny Catucci, Elyria, Ohio, assignor to The General Industries Company, Elyria, Ohio, a corporation of Ohio Application January 12, 1938, Serial No. 184,581

1 Claim. (Cl. 242—84.4)

My invention relates to fishing reels and relates more particularly to fishing reels adapted for use in deep sea fishing.

It is an object of my invention to provide a fishing reel of the class described with improved level wind means for guiding the fishing reel while reeling off or playing out the line as well as playing it in.

Another object of my invention is to provide a fishing reel of the class described with improved level wind means for automatically guiding the line from side to side of the reel spool when it is reeled in or when the line is played out.

Another object of my invention is to provide improved level wind means for a reel of the class described for taking up the strains to which such reels are subjected.

Another object of my invention is to provide improved level wind means for a reel of the class described by which any destructive lever action is reduced to a minimum.

Another object of my invention is to provide a reel of the type referred to having improved dual level wind means for supporting pressure exerted thereon when making a "catch" of deep sea fish.

Another object of my invention is to provide a reel of the type referred to which is simple and more compact in construction, easily assembled and economical to produce.

Other objects of my invention and the invention itself will become increasingly apparent to those skilled in the art to which my invention appertains by reference to the following description of an embodiment thereof and in which description reference will be had to the annexed drawings forming a part of the specification.

Referring to the drawings:

Fig. 1 is a side elevational view of the crank side of the reel of my invention;

Fig. 2 is a side elevational view of the opposite side of the reel of my invention illustrated in Fig. 1;

Fig. 3 is a top plan view of the reel of my invention showing in dotted lines the line passing yoke of my invention loosely mounted on two shafts;

Fig. 7 is a sectional view taken on the line 7—7 of Fig. 1.

Figure 4:
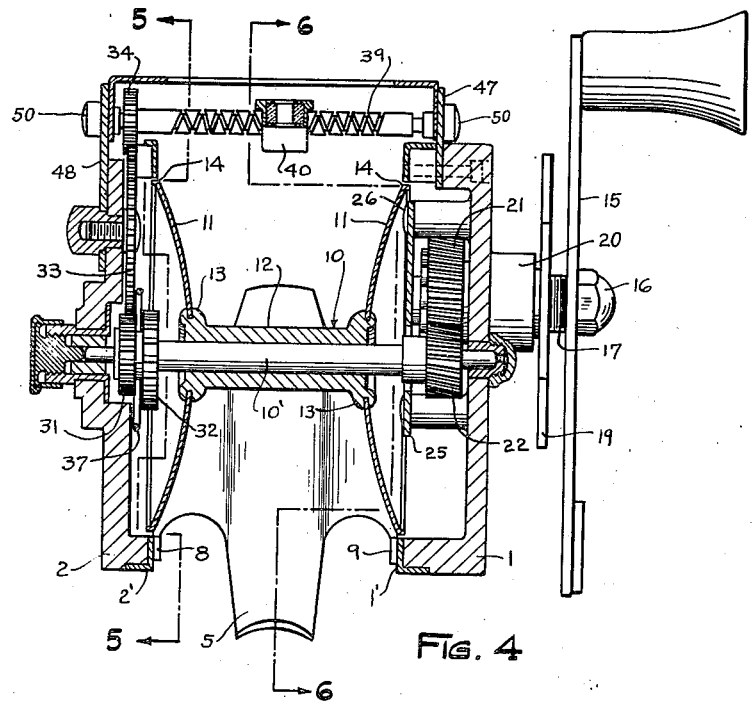
Fig. 4 is a view partially in section taken along the line 5—5 of Fig. 3.

The reel structure is composed of front and rear plates 1 and 2, each of which is composed of suitable molded composition, such as hard rubber, Bakelite or the like, and inner plates or discs 1' and 2' of metal or the like material. The plates are connected with the usual spacing pillars or posts 3 secured thereto by machine screws 4, and a supporting bracket 5 which is arcuate and comprises two semi-cylindrical arms 6, the bracket being adapted to be mounted on a fishing rod 7 as indicated in dotted lines in Fig. 1. The bracket 5 is secured to the inner discs 1' and 2' by downwardly projecting flanges 8 and 9, which are secured to said discs by means of rivets or the like, or to the plates 1 and 2 by machine screws not shown.

A spool 10 is disposed between the end plates 1 and 2 and provided with a pair of cup-form discs 11 secured coaxially upon the center spool hub 12 by means of portions 13 of the hub which are spun outwardly about an intermediate wall portion of each disc 11 through which the hub 12 extends. The spool shaft 10' fits tightly in the hub 12. The outer margin 14 of each disc 11 is turned outwardly into a circular perforation formed in the end plates 1' and 2' in such a manner as to insure the extremity of the disc being disposed in the perforation but without interfering with relative rotation between the discs and end plates.

A crank 15 is rigidly secured (see Figs. 4 and 7) to the reel by means of a nut 16 which is screw-threaded upon a threaded member 17 carried by a bearing element 18 and the screw threaded member 17 has a portion thereof unthreaded and of substantially rectangular shape adapted to receive a central portion of the crank 15 which has a substantially rectangular slot disposed therein. Screw-threaded on a threaded larger portion of said member 17 is a star-finger piece 19 employed for the usual purposes of adjusting the drag to any desired tension. A collar 20 projects within and forms a part of the end plate 1.

Within the end plate 1 and telescoped over the bearing element 18, a spiral gear 21 is disposed which engages a pinion 22 carried by an end of the spool shaft 10'. Superposed over said first gear 21 is a ratchet wheel 23 which engages a pawl 24. When the crank 15 is rotated in a clockwise direction the gear 21 and pinion 22 are rotated to move the spool shaft 10' which carries the line in such direction as to wind the line thereon.

To brake the mechanism the pawl is carried by a triangular shaped plate 25, centrally perforated to receive the spool shaft and the pinion carried thereby, and pivoted at one corner 26 to an extension of the end plate and at the other end 27 having a screw projected through a perforation in said plate 25 which in the form shown herein is an oblong perforation of greater length than said screw diameter, to allow the gear 21 and ratchet 23 and the handle carried by the bearing element 18 to be moved out of engagement with the pinion 22 when a throw-off lever 28 is moved either forward or backward along said end plate.

Figures 5, 6:
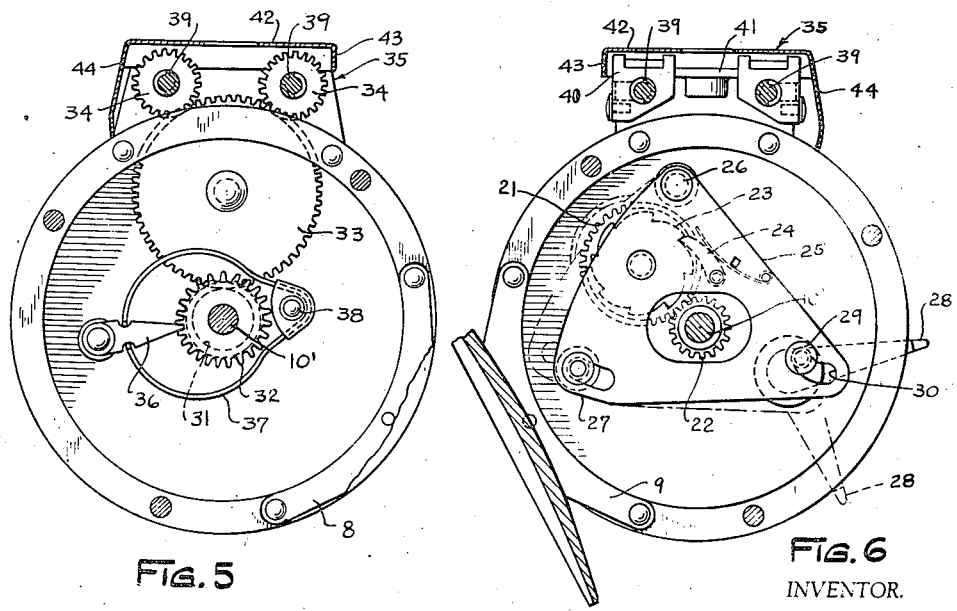
Fig. 5 is a view, partially in section, taken along the line 5—5 of Fig. 4.
Fig. 6 is a view partially in section taken along the line 6—6 of Fig. 4, the dotted lines illustrating the position of the gears when out of engagement with the spool pinion.

The dotted lines in Fig. 6 illustrate the alternate positions of the gear 21, the ratchet 23, the plate 25, and the throw-off lever 28. It will be noted that the throw-off lever 28 is secured at one end to the plate by a screw 29 adapted to move in a longitudinal slot 30 in the plate, to several illustrated positions. In this manner, the crank member 15 and its associated elements engaged with the spool by means of the gears 21 and 22, is moved out of and into engagement with the said gear 22 and the spool.

The other end plate 2 receives an opposite reduced shaft end of the spool 10, and a spur gear 32 and pinion gear 31 are carried thereon, the pinion gear 31 having continuously meshed engagement with the main gear 33 which is pivoted on the end plate 2 and which engages in turn a pair of spur gears 34 carried by a tandem level winder 35. The conventional "click" arrangement is shown in Fig. 5 which includes a pawl 36 pivotally mounted on the end plate 2 and adapted to swing in opposite directions. Preferably the pawl is tensioned by means of a spring 37 having upwardly extending ends adapted to press against either side of the pawl and to tension the pawl when it is moved in either direction. The yoke portion of the spring is secured to the end plate 2 at a point opposite the pawl, as indicated at 38, the pawl 36 engaging a ratchet wheel 32, which is rigidly secured to the spool shaft 10' whereby a drag may be transmitted to the spool to prevent free rotation thereof.

The gears 34 are rigidly mounted on two substantially parallel double reversely threaded shafts 39 upon which a pair of followers 40 ride, said followers being slotted to loosely receive a central yoke member 41 centrally perforated and having a reinforcing eye or agate bushing rigidly secured thereto.

When the spool is rotated in either direction, as by either the crank 15, as before described, or by a pull on the line, or similar methods, the gear 31 engages the main gear 33 which in turn communicates motion to the gears 34. The rotation of these gears and their shafts 39 causes the followers 40 and the central yoke member 41, through which the line passes, to move across the shaft and back again in unison. The yoke 41 being loosely mounted on both shafts, is free to adjust itself in alignment with both followers exerting on each an equal pressure.

The equal support of the eye or line guide member by both followers and their shafts also aids this portion of the reel in withstanding heavy line pull which occurs when playing a large fish.

The yoke is also placed in close proximity to the axis of the reversely threaded shafts and this reduces to a negligible minimum destructive lever action which is the main source of wear in the usual design of the present winders. The absence of this destructive lever action, added to the fact that the pressure is borne by two shafts instead of one, causes this structure to have a long life and to easily withstand heavy strains of line pull.

The shafts, gears, followers, and yoke are enclosed in a U-shaped structure composed of a longitudinally slotted plate 42 having downturned side flanges 43 and 44 and end flanges 45 and 46 which are secured to plates 47 and 48 by screws 49. The shafts 39 are loosely journaled in studs 50 which secure the plates 47 and 48 to the shafts. Screw members 51 attach the plates 47 and 48 to the end plates 1 and 2.

It is to be understood that many changes and modifications may be made in my construction and from the structure herein illustrated and disclosed, but without departing from the spirit of my invention.

I claim:

In a fishing reel structure, the combination of a frame, a spool, a pair of reversely threaded shafts, a pair of line guide carriages adapted to move back and forth along said shafts, line guide means disposed centrally of said line guide carriages having a guiding eye mounted therein, which eye is disposed in the same plane as the axes of the pair of reversely threaded shafts, said guide means being loosely mounted in slots provided in said carriages and adapted to be mounted therein outwardly of the plane of said eye.

PLINY CATUCCI.